(No Model.)

F. A. MARTIN.
PLOW POINT.

No. 570,673.  Patented Nov. 3, 1896.

Attest.
Ida Steitz
Samuel McQuinn

Inventor.
Frank A. Martin.
by James H. Layman.
Atty

UNITED STATES PATENT OFFICE.

FRANK A. MARTIN, OF HARRISON, OHIO.

PLOW-POINT.

SPECIFICATION forming part of Letters Patent No. 570,673, dated November 3, 1896.

Application filed June 3, 1896. Serial No. 594,073. (No model.)

*To all whom it may concern:*

Be it known that I, FRANK A. MARTIN, a citizen of the United States, residing at Harrison, in the county of Hamilton and State of Ohio, have invented certain new and useful Improvements in Plow-Points; and I do hereby declare the following to be a full, clear, and exact description of the invention, reference being had to the annexed drawings, which form a part of this specification.

My invention comprises a special construction of "point" to be applied to any approved form of plowshare, the principal object of the improvement being to enable the implement to cut through thick roots and other similar obstructions without imposing any severe strain on the horses. To accomplish this result, the cutting edge of the point has a number of scallops or wave-shaped indentations, which are comparatively shallow in front, but gradually increase in depth as they proceed rearwardly. Consequently the first one of these wave-shaped projections penetrates a root only a limited distance; but the second projection cuts still deeper, and so on until the obstruction is completely severed, as hereinafter more fully described.

Figure 1:
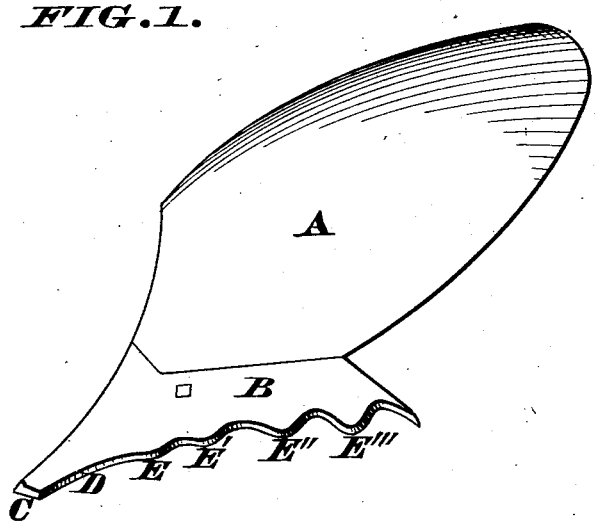
Figure 2:
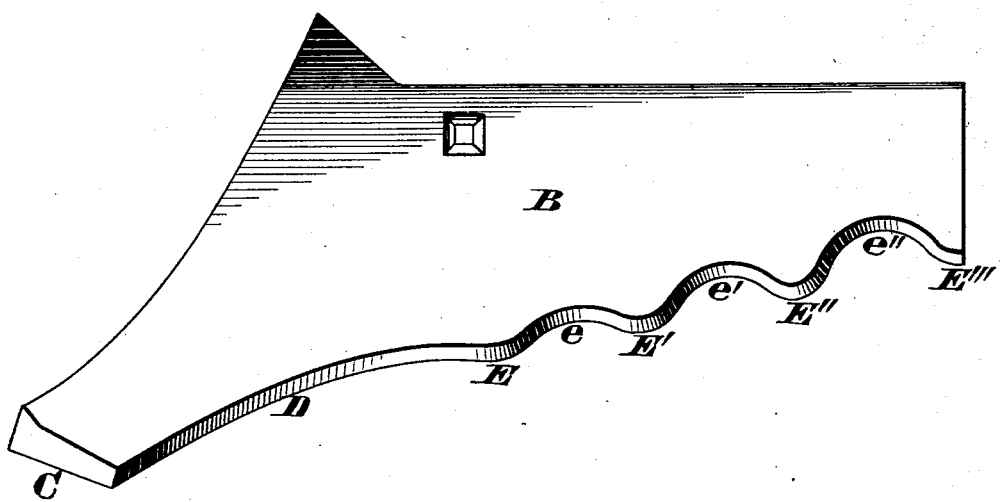

In the annexed drawings, Figure 1 is a perspective view of a plowshare provided with my improved point. Fig. 2 is an enlarged plan of said point.

The share A, which may be of any desired size, shape, and material, has secured to it the point B, usually of steel and having a nose C, that penetrates the soil in the customary way. Starting at this nose the cutting edge of the point is suitably concaved at D, which curve joins the first one, E, of a series of projections E' E'' E'''. These projections are so arranged as to impart to the cutting edge of the point a scalloped or wave-shaped outline, the interdental spaces e e' e'' between said projections being gradually deepened as they proceed rearwardly. This peculiar shape of the cutting edge is more clearly seen in Fig. 2, reference to which illustration shows that when the plow comes in contact with a root the rounded projection E will naturally do the first cutting, but the incision so made in the obstruction will be comparatively shallow; but a slight advance of the share brings the second projection E' into service, the result being a still deeper cutting of the obstruction, and so on until the last swell E''' has performed its duty. It will also be noticed that the scallops are formed by convolutions or curves that bend out and in, thereby enabling the advancing edge of each projection to have a "shearing cut," while the trailing edges of said projections are entirely free from any incising action. Therefore this progressive shearing action enables the plow to cut through very thick roots, &c., without imposing any severe strain either upon the horses or implement. Again, these rounded projections assist in breaking up the soil, and by rendering it quite loose and friable there is no compact mass to wedge against the moldboard and thereby increase the friction of the plow. Furthermore, actual practice has demonstrated very conclusively that the scallop-edged point increases the downward draft or "suction" in the ground and prevents the share running up through the furrow. Finally, although the shape of my plow-point is somewhat peculiar, still its rounded cutting edges are very readily sharpened, and without requiring any special tool to do the work.

I am aware that it is not new to provide a plow-point with a serrated cutting edge, as such teeth-shaped projections are seen in Letters Patent No. 14,075, granted January 8, 1856, to W. E. Wyche. Therefore I disclaim the shape of teeth seen in said patent and expressly limit my invention to the specific form of projections herein shown and described—that is to say, said projections are not serrated nor angular, but consist of circular arcs that alternately curve in and out and gradually deepen as they proceed rearwardly.

I claim as my invention—

As a new article of manufacture, the within-described specific construction of plowshare-point, which construction includes a plate whose cutting edge has a series of scalloped or wave-shaped projections formed of reverse circular arcs that gradually increase,in depth, as they proceed rearwardly, all as set forth, and for the purpose stated.

In testimony whereof I affix my signature in presence of two witnesses.

FRANK A. MARTIN.

Witnesses:
FRANK BOWLES,
J. G. HANCER.